Figure 1:
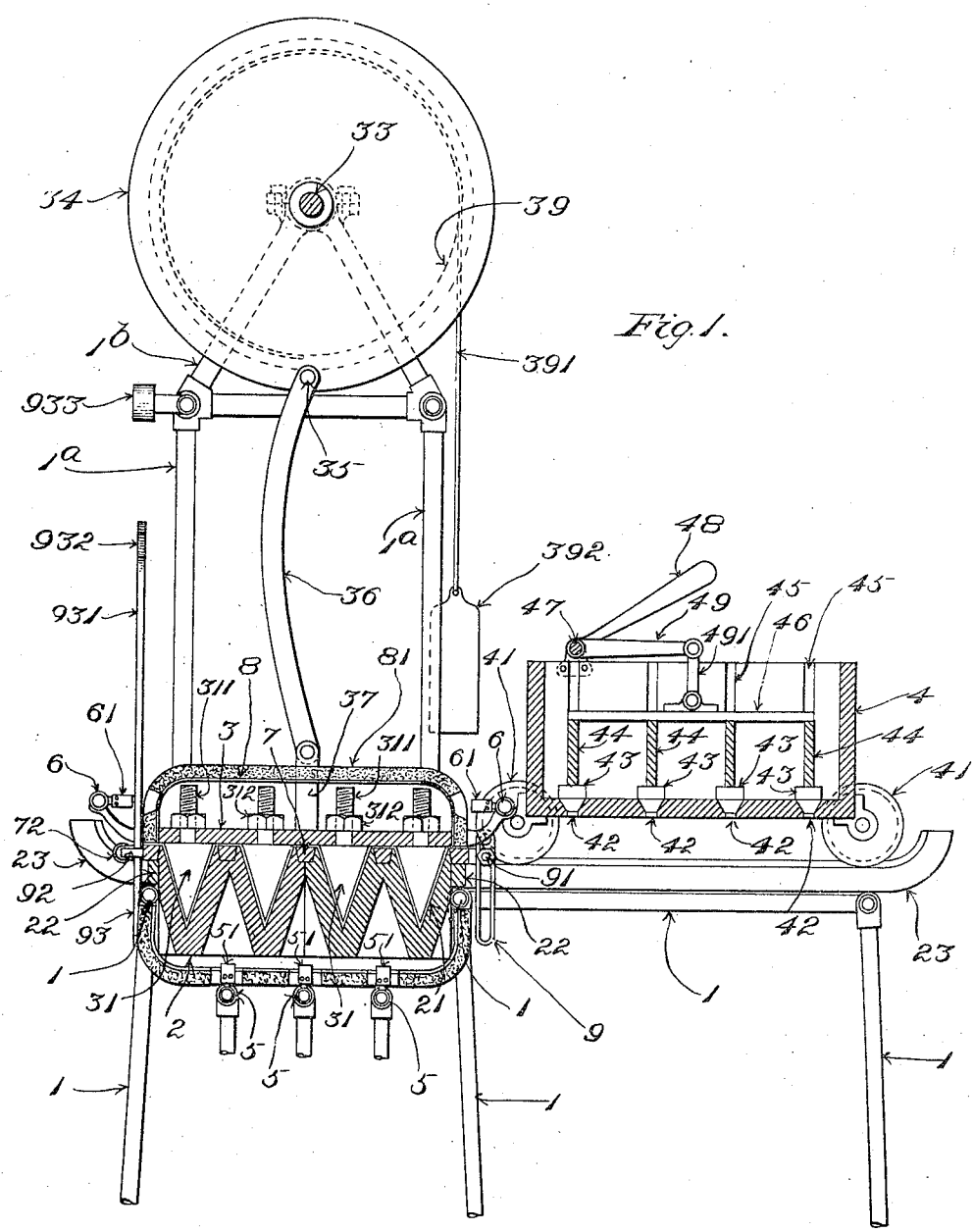

No. 841,211. PATENTED JAN. 15, 1907.
J. ABRAHAMS.
MACHINE FOR MAKING PASTRY HORNS OR CUPS FOR CONTAINING ICE CREAM, &c.
APPLICATION FILED MAY 24, 1906.

3 SHEETS—SHEET 1.

Witnesses:
Oscar F. Hill
Edith J. Anderson

Inventor:
Jacob Abrahams
By Chas. F. Randall
Attorney.

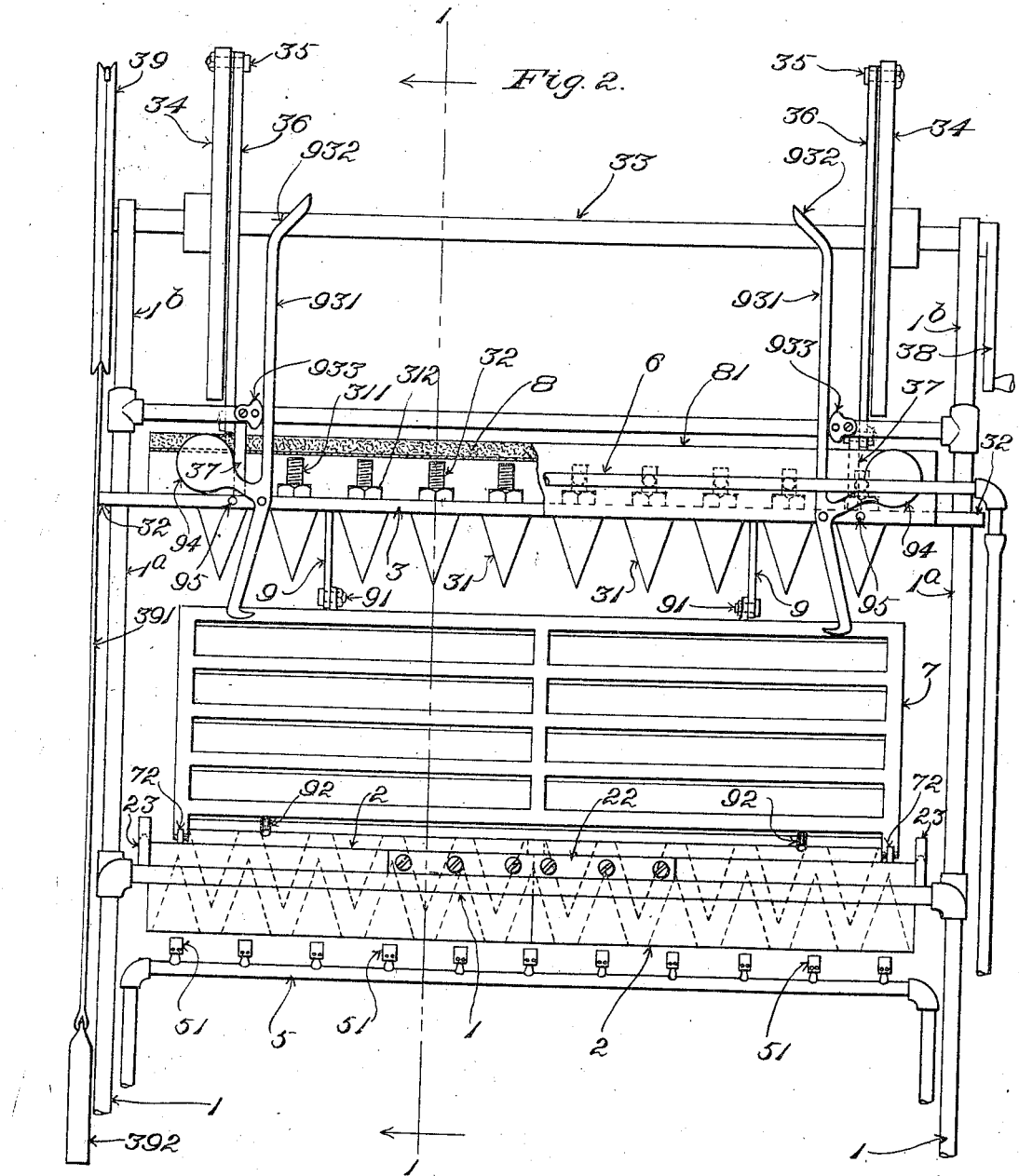

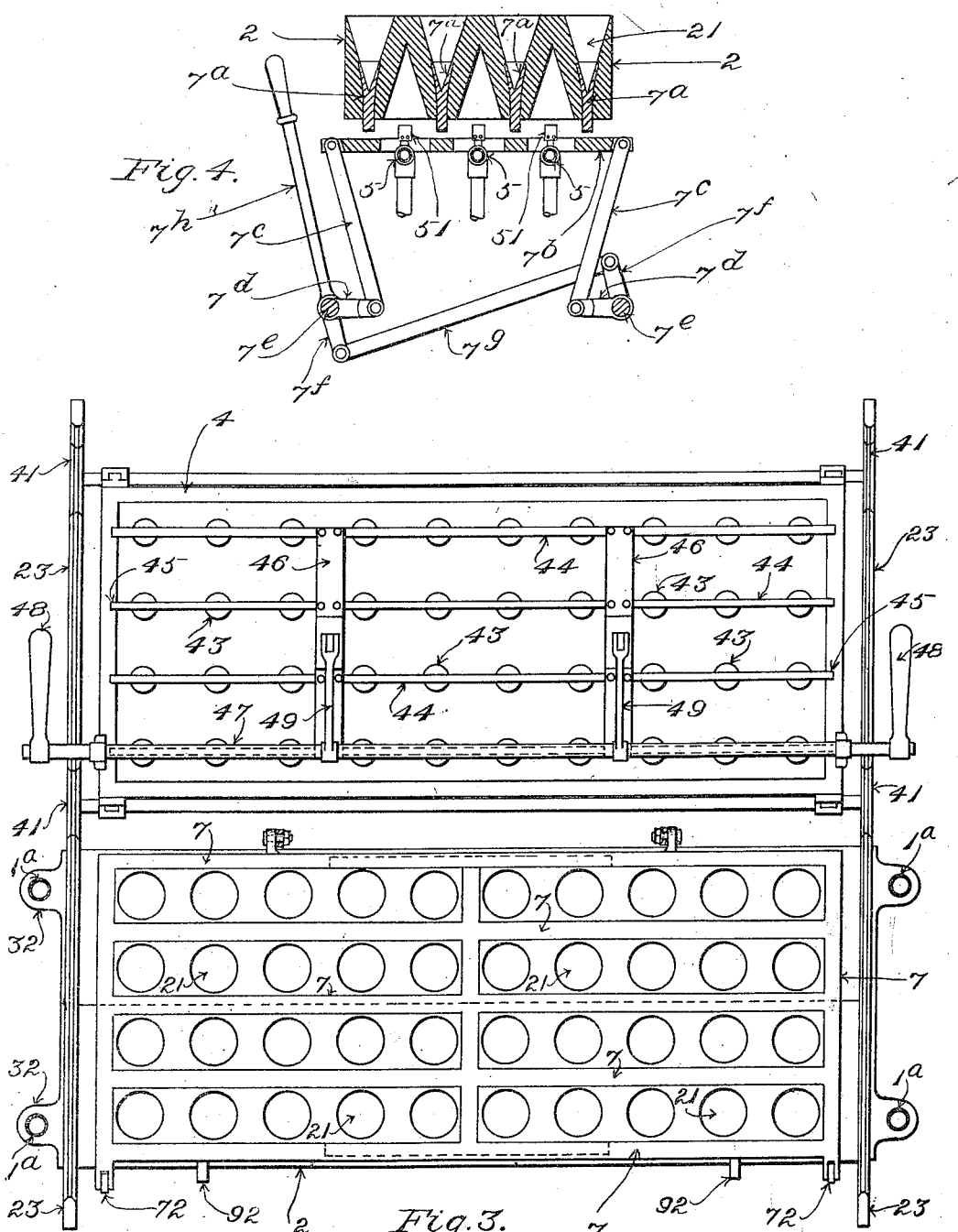

UNITED STATES PATENT OFFICE.

JACOB ABRAHAMS, OF BOSTON, MASSACHUSETTS.

MACHINE FOR MAKING PASTRY HORNS OR CUPS FOR CONTAINING ICE-CREAM, &c.

No. 841,211.      Specification of Letters Patent.      Patented Jan. 15, 1907.

Application filed May 24, 1906. Serial No. 318,440.

*To all whom it may concern:*

Be it known that I, JACOB ABRAHAMS, a citizen of the United States, residing at Boston, in the county of Suffolk, State of Massachusetts, have invented a certain new and useful Improvement in Machines for Making Pastry Horns or Cups for Containing Ice-Cream, &c., of which the following is a specification, reference being had therein to the accompanying drawings.

The object of the invention is to provide a machine for the convenient and expeditious production on a commercial scale of horns, cups, or the like composed of pastry material for containing ice-cream, desserts of different kinds, and other food preparations.

The invention in its more complete embodiment consists in an organized machine comprising, essentially, a bed having a series of mold-cavities, a head provided with a corresponding series of cores or plungers to enter and partially fill the said mold-cavities, the said bed and head being movable relatively from and toward each other, a receptacle for paste in a semifluid condition provided with means for delivering the said paste into the said mold-cavities when the bed and plate are separated from each other, means for supplying heat to bake the horns, cups, or other containers between the walls of the mold-cavities and the said cores or plungers when the bed and head have been closed together so as to cause the said cores or plungers to enter the mold-cavities and cause the paste to form thin shells occupying the spaces intervening between said walls and cores or plungers, and means for providing for the removal of the baked horns, cups, or other containers from the mold-cavities.

The invention admits of a variety of embodiments, since the specific form, construction, and arrangement of the respective elements may be changed in different respects within the scope of the invention.

In the drawings, Figure 1 shows in vertical transverse section on line 1 1 of Fig. 2 a machine embodying the invention, the head and bed being closed together. Fig. 2 is a front elevation of the machine with the head and bed separated from each other and the cover beneath the bed omitted. Fig. 3 is a view in horizontal section on line 3 3 of each of Figs. 1 and 2. Fig. 4 is a view of the bed in transverse vertical section, showing a modification of the means providing for the removal of baked horns or the like from the mold-cavities.

Having reference to the drawings, the machine shown is provided with cone-shaped mold-cavities in the bed and conical cores or plungers on the head and is suitable for the production of hollow cone-shaped so-called "horns." It will be obvious that the mold-cavities and cores or plungers may have other forms as may be required in order to vary the shape of the product.

At 1 is the supporting-framework of the machine, it being composed, preferably, of sections of pipe joined together by suitable couplings.

2 is the bed, with mold-cavities 21.

3 is the head, with cone-shaped cores or plungers 3¹.

4 is a tank for containing prepared paste in a semifluid condition and from which the said paste is supplied to the said mold-cavities.

5 5 5 are gas-pipes equipped with burners 51 for heating the bed 2.

6 6 are gas-pipes equipped with burners 61 61 for heating the cores or plungers.

7 in Figs. 1, 2, and 3 is a lifter plate or grate by means of which the horns after being baked are withdrawn from the mold-cavities, the said lifter plate or grate engaging with flanges or rims formed on the large ends of the horns.

Referring now to the constructional details and to the means of operation, for convenience in construction the bed 2 is formed in sections—four in the present instance—which are arranged and assembled as shown in Figs. 1, 2, and 3 and are held together by means of strips 22 22 of key-steel, that are applied to the front and rear sides, respectively, of the bed, and strips 23 23, also of key-steel, that are applied to the opposite ends of the bed, the said strips being secured by suitable bolts or screws to the respective bed-sections and serving to bind them together. The bed fits within a rectangular opening in the framework and is supported in place therein by the strips 22 23, &c., resting on horizontal portions of the framework, as indicated, for instance, in Figs. 1 and 2. The mold-cavities 21 21 extend downward into the bed from the upper face of the latter. At the under side or back of the bed as much as possible of the latter is made hollow or open, so as to avoid the presence of unnecessary metal and make the walls of the mold-cavities as nearly as possible uniform throughout in thickness. This tends to quickness and uniformity in heating the bed. The gas-pipes 5 5 5 are located beneath the bed, and their burners 51 51, &c., are arranged and located at convenient intervals.

Grooves are formed in the top of the bed between the mouths or openings of the mold-cavities to receive the strips or bars of the lifter plate or grate 7. (See Fig. 1.) For the purpose which will be explained hereinafter the lifter plate or grate is provided at its opposite ends with projections extending toward the front of the machine and carrying antifriction-rolls 72 72.

The head 3 is located above the bed 2 and is mounted with capacity to be moved vertically from its position in Fig. 1 to that in Fig. 2, and vice versa. It is guided in its vertical movements by means of corner-posts 1ª 1ª, &c., forming portions of the machine-framework, the head having at its corners projecting lugs 32 32, &c., which are bored to fit the corner-posts 1ª 1ª, &c. In the movements of the head up and down the said lugs slide upon the said corner-posts. For the convenient actuation of the head an operating-shaft 33 is mounted in bearings with which stands 1ᵇ 1ᵇ at the top of the machine are provided, the said stands being carried by the framework 1. The said operating-shaft is connected with the head by means of crank-disks 34 34, provided with crank-pins 35 35, to which are pivotally joined the upper ends of connecting-rods 36 36, the lower ends of the latter being connected pivotally with stands 37 37, secured to the head 3 and extending upward therefrom. The shaft 33 is provided with a crank-handle 38 for convenience in operating the same manually. For the purpose of more or less completely counterbalancing the weight of the head a wheel or pulley 39 is fixed upon the shaft 33, the said wheel or pulley having attached to its periphery one end of a flexible connector 391, which supports at its other end a weight 392. In order to lock the head in its uplifted position, the connecting-rods 36 36 are bent or curved, as shown in Fig. 1, so as to permit the crank-pins 35 35 to be carried around somewhat past top center before the turning movement of the shaft 33, which operates to raise the head, is arrested in consequence of the connecting-rods 36 36 being carried into contact with the shaft 33.

The cores or plungers 31 31 are provided with stems 311 311, rising centrally from the bases thereof. The cores or plungers are connected with the head 3 by means of the said stems, which are passed through holes that are made through the head. The said stems are screw-threaded and receive thereon nuts 312 312 above the head, by means of which the cores or plungers are clamped to the latter. To insure the effective heating of the cores or plungers, the burners 61 61 of the gas-pipes 6 6 at front and rear of the machine are located in positions to cause the flames therefrom to play against the portions of the stems 311 311 which rise above the head 3. For the purpose of confining the heat above the head and around the stems 311 311 of the cones or plungers a sheet-metal hood or cover 8 is applied to the head 3, the said hood or cover inclosing the space above the latter, in which the stems 311 311 of the cores or plungers are located. The said hood is provided with a layer 81 of asbestos or other indestructible heat-non-conductor. Holes are made through the hood and its non-conducting layer at points corresponding with the burners 61 61, &c., as shown in Fig. 1.

For the purpose of raising the lifter plate or grate 7 automatically when the head 3 is lifted the head 3 is provided at the rear side thereof with lugs to which are attached strips 9 9, that extend downward, and are formed with vertically-elongated slots, as indicated in Fig. 1. Lugs projecting rearward from the lifter plate or grate are provided with studs 91 91, that enter the slots of the strips 9 9. From the front side of the lifter plate or grate pins or projections 92 92 project forwardly, and upon the front of the head 3 are pivoted hooks 93 93, that are weighted, as at 94, Fig. 2, to hold the said hooks normally against stops 95 95 on head 3 in position to engage with the pins or projections 92 92. The construction is such that in the rising movement of the head it first moves upward a predetermined distance corresponding with the length of the cores or plungers 31 31, &c., so as to withdraw the said cores or plungers from the mold-cavities 21 21. The hooks 93 93 and the lower end walls of the slots in the strips 9 9 then engage with the pins or projections 92 92 and studs 91 91, so as to cause the lifter plate or grate to accompany the head. For the purpose of automatically disengaging the hooks 93 93 from the pins or projections 92 92 after the lifter plate or grate has been raised far enough to withdraw the baked horns from the mold-cavities, so as to allow the front portion of the lifter plate or grate to descend, the said hooks are furnished with upwardly-extending tails 931 931, having inclined or cam-shaped portions 932 932, and for coaction with the said inclined or cam-shaped portions projections 933 933 are provided upon the upper part of the machine-framework in the paths of the said portions. When the inclined or cam-shaped portions are carried upward against the projections 933 933, the result of the engagement is to turn the hooks upon their pivots so as to withdraw them from the pins or projections 92 92, thereby freeing the front portion of the lifter plate or grate and allowing it to descend until the rolls 72 72 come to bear upon the end portions of the bed 2. During the remainder of the rise of the head the lifter plate or grate will gravitate toward a vertical position, the rolls 72 72 rolling upon the end portions of the bed, the final position of the lifter plate or grate being preferably, however, an inclined position substantially such as that which is shown in Fig. 2.

The tank 4 occupies normally a position at the rear of the bed and head, as shown in Figs. 1 and 3. In order to enable it to be moved forward into position above the bed after the head has been raised, it is mounted, by means of grooved rolls or trucks 41 41, upon tracks which are constituted by the upper edges of the strips 23 23, that are attached to the ends of the bed, the said strips being extended to the rear of the bed sufficiently to allow the tank to assume its normal position aforesaid. To prevent dislodgment of the said trucks from the said tracks, the trucks are grooved as aforesaid, and the upper edges of the strips 23 23 fit within the said grooves. In order to provide for discharge of the paste from the tank into the mold-cavities 21 21, &c., the tank is provided in its bottom with outlets 42 42, spaced and arranged to correspond with the said mold-cavities. In the forward position of the tank these outlets are located over the mold-cavities in position to deliver into the latter. The outflow through the said outlets is controlled by means of plugs or valves 43 43. The said plugs or valves are carried by strips 44 44, &c., extending longitudinally of the tank and having the opposite ends thereof fitted to guides or ways at the opposite ends of the tank. The strips 44 44, &c., are united to work in unison by means of cross-bars 46 46, and for the purpose of enabling the plugs or valves to be operated as required an operating-shaft 47 is mounted in bearings upon the tank, it being provided at each end with a handle 48, by means of which to turn the same when necessary, and with arms 49 49, which are connected by links 491 491 with the cross-bars 46 46.

The hollow places or openings at the back or under side of the bed catch and retain the heated products of combustion rising from the burners beneath the said bed. For the purpose of confining the heat in proximity to the bed a cover 21ª is employed beneath the latter, the said cover having an exterior layer of indestructible heat-non-conducting material 21ᵇ. This cover is omitted in Fig. 2.

In the use of the machine, the head and lifter plate or grate being in the position in which they are shown in Fig. 2, the tank 4 is moved forward from its position in Figs. 1 and 3 to a position in which the outlets 42 42 are located over the mold-cavities 21 21, &c. In traveling forward the front of the tank presses against the under side of the lifter plate or grate and raises the latter. After the tank has arrived in the proper position a handle 48 is operated to move the plugs or valves 43 43, &c., to open the outlets 42 42, &c. After a proper quantity of paste has been permitted to flow into the respective mold-cavities 21 21, &c., the plugs or valves 43 43, &c., are permitted or caused to close the said outlets, after which the tank is moved rearward to its position in Fig. 1 again. Shaft 33 then is turned by hand to lower the head 3. As the said head moves downward, lowering the lifter plate or grate 7, the rolls 72 72 at the front of the latter travel upon the top surface of the bed until its bars or strips enter the grooves or recesses which are provided for the reception thereof in the top of the head 2, with the assistance of the operator, if necessary. The descent of the cores or plungers 31 31, &c., into the mold-cavities forces the paste that is contained in the latter up in the space between the cores or plungers and the walls of the mold-cavities. The quantity of paste admitted into each mold-cavity is sufficient to cause an overflow at the top, so that a portion of paste is forced out of the mold-cavity and flows over and onto the bars or strips of the lifter plate or grate 7. The head and bed are caused to remain closed together until the baking of the horns has been completed, whereupon the shaft 33 is operated to raise the head. The first portion of the rise of the head takes place without any change in the position of the lifter plate or grate until after the cores or plungers 31 31, &c., have been withdrawn from the horns, leaving the latter within the mold-cavities. As soon, however, as the withdrawal of the cores or plungers from the mold-cavities and horns has occurred the hooks 93 93 and strips 9 9 act to cause the lifter plate or grate to rise in unison with the head. The bars or strips of the lifter plate or grate by acting at the under side of the overlapping flanges of the horns operate to raise the horns, so as to withdraw them from the mold-cavities. As soon as this withdrawal has been completed the hooks 93 93 are disengaged automatically from the pins or projections 92 92, carried by the front side of the lifter plate or grate, allowing the front portion of the said lifter plate or grate to drop until the rolls 72 72 take bearing upon the top of the bed. During the remainder of the rise of the head the lifter plate or grate gravitates toward the position in which it is shown in Fig. 2. In this position of the lifter plate or grate the removal of the horns therefrom is effected easily by hand.

Fig. 4 shows a modified means of effecting the loosening and lifting of the horns after they have been baked. In the said figure, 7ª 7ª are pins occupying holes bored through the bed 2 in continuation of the mold-cavities and movable up and down within such holes. The upper portions of the said pins are conical and fit corresponding seats in the holes through the bed. Normally the pins rest against such seats and close the said holes. The upper end of each pin is formed with a conical pocket therein in continuation of the upper portion of the corresponding mold-cavity formed in bed 2. The lower ends of the pins project beneath the under side of the bed into position to be acted against by a convenient operating device. At 7ᵇ is a plate located beneath the bed 2 and resting normally upon the gas-pipes 5 5 5. The said plate has holes therethrough corresponding in position with the respective burners 51 51, &c., and through which the said burners project when the plate occupies its lowest position. For the purpose of lifting the pins in order to push the baked horns out of the mold-cavities the plate 7ᵇ is moved upward. To occasion this movement, the plate is connected, by means of rods or links 7ᶜ 7ᶜ, to arms 7ᵈ 7ᵈ on rock-shafts 7ᵉ 7ᵉ, which are suitably mounted on the machine-framework. The rock-shafts are connected to cause them to turn in unison by means of arms 7ᶠ 7ᶠ, which are respectively fast upon the respective rock-shafts and joined together by a rod or link 7ᵍ. The rock-shaft at the front of the machine is provided with an operating-handle 7ʰ. By means of the said handle the rock-shafts may be turned so as to raise the plate 7ᵇ and pins 7ᵃ for the purpose of pushing the baked horns up from the mold-cavities and afterward turned reversely so as to lower the said plate and permit the pins to drop into their normal positions again.

The constructional details and the arrangement of parts may be varied within the scope of my invention.

I claim as my invention—

1. A machine for the purpose set forth comprising, essentially, a bed having a series of mold-cavities, a head provided with a corresponding series of cores or plungers to enter and partially fill the said mold-cavities, the said bed and head being movable relatively from and toward each other, a receptacle for paste in a fluid condition provided with means for delivering the said paste into the said mold-cavities, and means in connection with the said bed and head for supplying heat at both the inside and the outside, simultaneously, of the horns, cups, &c., to bake the latter.

2. A machine for the purpose set forth comprising, essentially, a bed having a series of mold-cavities, a head provided with a corresponding series of cores or plungers to enter and partially fill the said mold-cavities, the said bed and head being movable relatively from and toward each other, a receptacle for paste in a fluid condition provided with means for delivering the said paste into the said mold-cavities, said receptacle mounted to move into position over the said mold-cavities to feed paste into the latter and also to withdraw from between the bed and head to permit the closing together of the latter, and means in connection with the said bed and head for supplying heat at both the inside and the outside, simultaneously, of the horns, cups, &c., to bake the latter.

3. A machine for the purpose set forth, comprising, essentially, a bed having a series of mold-cavities, a head provided with a corresponding series of cores or plungers to enter and partially fill the said mold-cavities, the said bed and head being movable relatively from and toward each other, a receptacle for paste in a fluid condition provided with means for delivering the said paste into the said mold-cavities, means in connnction with the said bed and head for supplying heat at both the inside and the outside simultaneously of the horns, cups, &c., to bake the latter, and means to remove the baked horns, cups, &c., from the said mold-cavities.

4. A machine for the purpose set forth, comprising, essentially, a bed having a series of mold-cavities, a head provided with a corresponding series of cores or plungers to enter and partially fill the said mold-cavities, means for introducing paste into the said mold-cavities, the said means movable into position above the said mold-cavities, between the bed and head when these latter are separated, and means for supplying heat to bake the horns, cups, or the like.

5. A machine for the purpose set forth, comprising, essentially, a bed having a series of mold-cavities, a head provided with a corresponding series of cores or plungers to enter and partially fill the said mold-cavities, means for introducing paste into the said mold-cavities, means for supplying heat to bake the horns, cups, or the like, and means for removing the latter from the mold-cavities.

In testimony whereof I affix my signature in presence of two witnesses.

JACOB ABRAHAMS.

Witnesses:
CHAS. F. RANDALL,
EDITH J. ANDERSON.